United States Patent [19]

Harima

[11] Patent Number: 5,237,965

[45] Date of Patent: Aug. 24, 1993

[54] FLUID COUPLING FOR A COOLING FAN OF AN INTERNAL COMBUSTION ENGINE

[75] Inventor: Toshio Harima, Kanagawa Pref., Japan

[73] Assignee: Atsugi Unisia Corporation, Atsugi, Japan

[21] Appl. No.: 835,181

[22] Filed: Feb. 13, 1992

[30] Foreign Application Priority Data

Feb. 21, 1991 [JP] Japan .............................. 3-007924[U]

[51] Int. Cl.$^5$ ................................................ F01P 7/02
[52] U.S. Cl. ................................ 123/41.12; 192/58 B; 192/82 T
[58] Field of Search ..................... 123/41.12; 192/82 T, 192/58 B

[56] References Cited

U.S. PATENT DOCUMENTS 4,116,318 9/1978 Crisenbery et al. ............... 192/82 T
4,190,139 2/1980 Tinholt et al. .................... 192/82 T

FOREIGN PATENT DOCUMENTS 60-241534 5/1984 Japan .

Primary Examiner—Noah P. Kamen
Attorney, Agent, or Firm—Bachman & LaPointe

[57] ABSTRACT

A fluid coupling of a cooling fan is for an internal combustion engine in an automotive vehicle and comprises labyrinth grooves defined by circular projections formed on a drive disc and a driven member, respectively. Rotating energy transmission from the engine to the cooling fan is carried out through the labyrinth grooves at which rotating energy is transmitted through an operating fluid. A plurality of passages are radially formed on the driven member to smoothly change the transmission ratio of the rotating energy by supplying the operating fluid to the outside portion of the labyrinth grooves.

7 Claims, 4 Drawing Sheets

FLUID COUPLING FOR A COOLING FAN OF AN INTERNAL COMBUSTION ENGINE

BACKGROUND OF THE INVENTION

1. Field of the Invention

The present invention relates to improvements in a fluid coupling, and more particularly to a fluid coupling which is used as a component of a cooling fan system for an internal combustion engine of a vehicle.

2. Description of the Prior Art

JP-A-60-241534 discloses a typical fluid coupling which is operated to adequately rotate a cooling fan for cooling an internal combustion engine. A casing and a cover are fixedly connected with each other and define a sealed space therebetween. A cooling fan is installed to the outer peripheral portion of the casing and cover of the fluid coupling. The sealed space is divided into a storage chamber and a torque transmission chamber by a partition plate having a hydraulic flow control hole. The drive disc having a disc portion and a shaft portion is sealingly connected to the casing through a bearing so that the disc portion is rotatably disposed in the torque transmission chamber. A valve member is attached on the partition plate so as to close and open the hydraulic flow control hole in accordance with the change of ambient temperature. The torque transmission from the drive disc to the cooling fan is controlled in a manner to change the connecting area between the drive disc and the wall of the casing through operating fluid. Furthermore, a weight member is attached to the free end portion of the valve member to decrease the opening degree of the hydraulic flow control hole in accordance with the increase of the rotating speed of the cooling fan. A fluid damming space is defined by a peripheral portion of the drive disc and a part of a wall defining the sealed space. A return passage is formed to communicate the torque transmission chamber and the storage chamber to circulate the operating fluid. Thus, this conventional arrangement solves problems that the rotating speed of the cooling fan is radically changed at a generally predetermined temperature condition. That is, this conventional arrangement prevents the occurrence of a fan noise and a degradation of fuel consumption due to the hunting phenomenon.

However, this arrangement is required in production to correctly adjust the rigidity of the valve member and the weight of the weight member since the control of the rotating speed of the cooling fan is carried out by utilizing a centrifugal force applied to the valve member. Additionally, this adjusting operation is difficult to be correctly carried out, and a production cost becomes high due to the increase of parts and the like.

SUMMARY OF THE INVENTION

It is an object of the present invention to provides an improved fluid coupling for a cooling fan, which is free of the above mentioned drawbacks.

A fluid coupling for an engine cooling fan according to the present invention comprises a drive member to which a driven member are rotatably and sealingly connected. The driven member defines a storage chamber and an operation chamber thereinside and has a plurality of circular projections to an operation chamber defining surface thereof. The storage and operation chambers are communicated with a drain passage. A disc member is disposed in the operation chamber and fixedly connected to the drive member. The disc member has a plurality of circular projections which are arranged to be engaged with the plurality of circular projections of the driven member at a predetermined distance to form labyrinth grooves therebetween. A passage is defined on the driven member so as to radially extend relative to the center axis of the driven member.

With this arrangement, a major part of the operating fluid is supplied to a diametrically outer side of the labyrinth grooves, and the degree of the energy transmission is smoothly changed in accordance with the amount of the operating fluid filled in the labyrinth grooves.

BRIEF DESCRIPTION OF THE DRAWINGS

In the drawings, like reference numerals designate like parts and elements throughout all figures, in which.

DETAILED DESCRIPTION OF THE INVENTION

Figure 1:
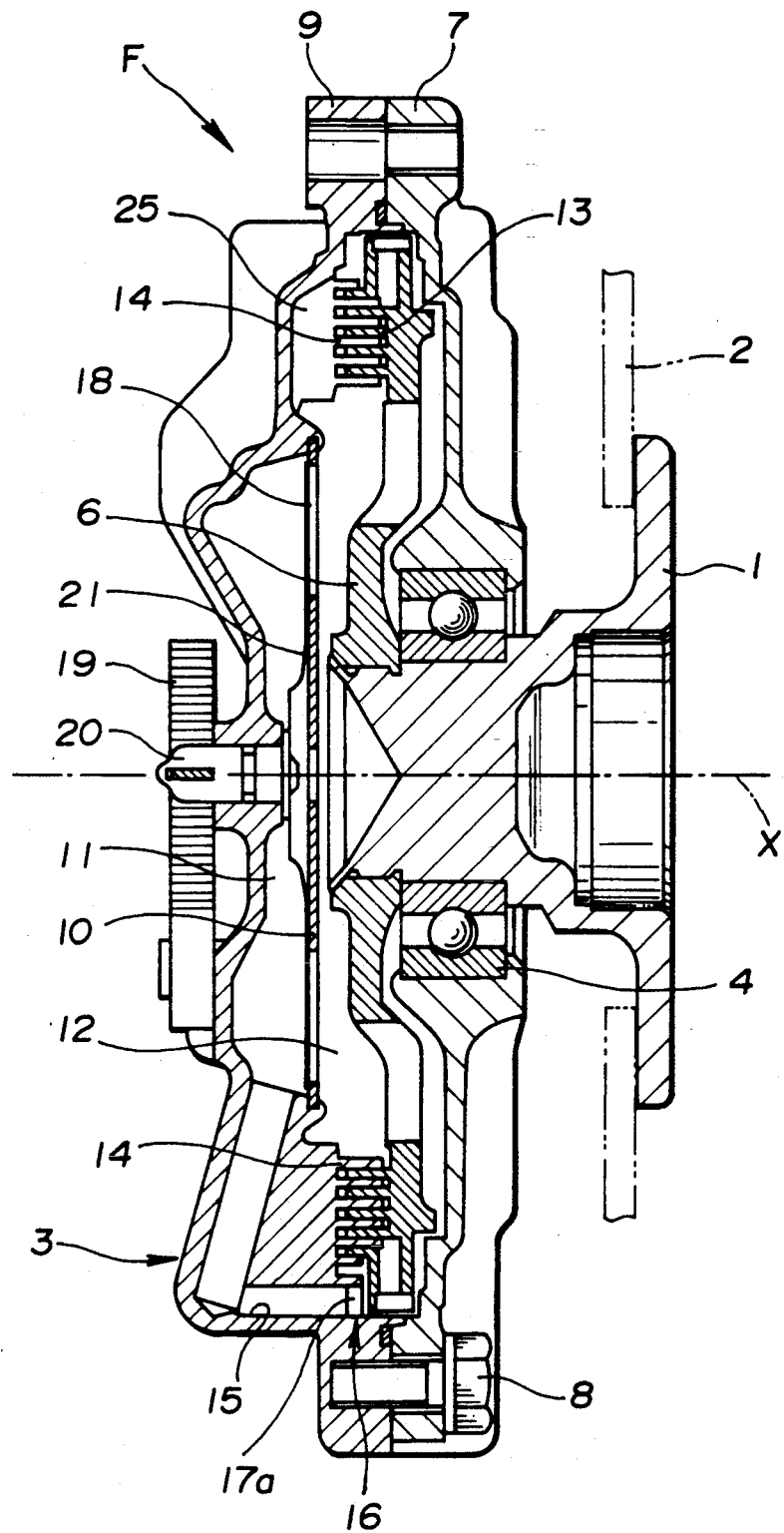
FIG. 1 is a side cross-sectional view of a first embodiment of a fluid coupling according to the present invention.
Figure 2:
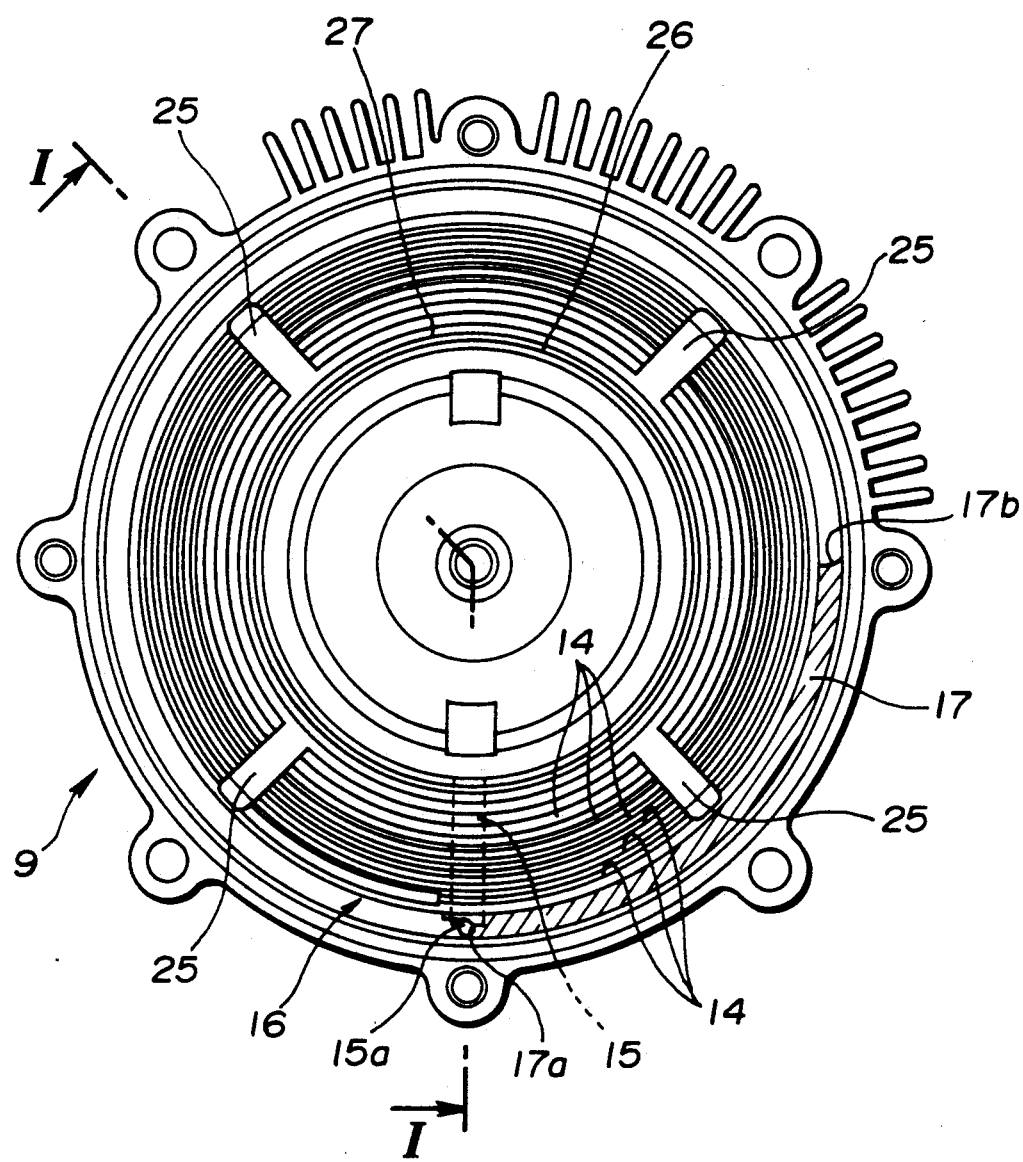
FIG. 2 is a plan view of a cover member of FIG. 1.
Figure 3:
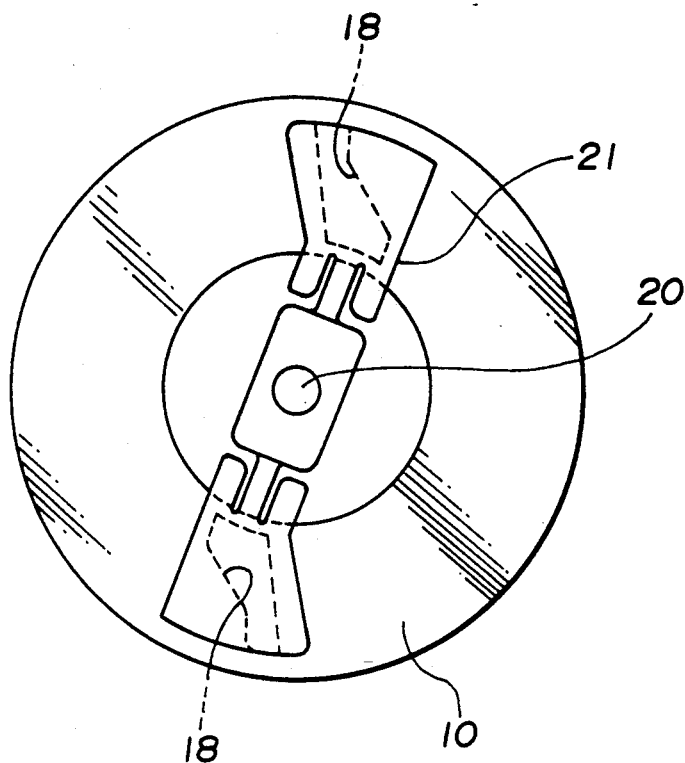
FIG. 3 is a plan view which shows an installation condition of a valve plate to a partition plate.

Referring now to FIGS. 1 to 3, there is shown a first embodiment of a fluid coupling F for a cooling fan of an internal combustion engine in accordance with the present invention.

As shown in FIG. 1, the fluid coupling F comprises a drive shaft 1 which is provided with a V-belt pulley 2. A housing 3, to which a cooling fan (though not shown) is secured, is rotatably supported to the drive shaft 1 through a bearing 4. The housing 3 includes a body member 7 fixedly engaged with the outer peripheral portion of the bearing 4 and a cover member 9 secured to the body member 7 with bolts 8. The body member 7 and the cover member 9 define a space thereinside. The space is divided into a storage chamber 11 and an operation chamber 12 by a partition plate 10. A disc member 6 is fixedly connected to a top end portion of the drive shaft 1 and disposed in the operation chamber 12. The disc member 6 has a plurality of circular projections 13 which protrude toward the cover member 9. The disc member 6 and the housing 3 are coaxially arranged relative to a center axis X of the drive shaft 1 as shown in FIG. 1. The circular projections 13 are engaged at a predetermined distance with a plurality of circular projections 14 of the cover member 9 so as to form labyrinth grooves therebetween. Operating fluid such as silicon oil is stored in the storage and operation chambers 11 and 12. The labyrinth grooves are arranged to act as a fluid coupling due to the viscous resistance of the operating fluid.

On the other hand, the cover member 9 has a drain passage 15 which communicates the storage chamber 11 and the operation chamber 12. A projection 17 is formed at an outer peripheral portion of the cover member 9 so as to be high at the portion marked by diagonally hatched lines between steps 17a and 17b, and to be low in the other portion, as shown in FIG. 2. With this arrangement, when the fluid coupling F is rotated, the projection 17 performs as a pump for supplying a fluid from the operation chamber 12 to the storage chamber 11 through the passage 17.

The partition plate 10 is provided with a through-hole 18 which communicates the storage chamber 11 and the operation chamber 12. A rotating shaft 20 is sealingly and rotatably engaged in a through-hole (no numeral) formed at a center portion of the cover member 9. The inner end (positioned in the storage chamber 11) of the rotating shaft 20 is fixedly connected with a valve plate 21 which is fittingly and slidably contacted with the partition plate 10. The other end of the rotating shaft 20 is fixedly connected with the central end portion of a bimetal 19 of a spiral shape. The other end of the bimetal 19 is fixed to the cover member 9. Accordingly, the rotating shaft 20 is rotated in accordance with the deformation of the bimetal 19 due to the change of air temperature at the rearward portion of a radiator (not shown). In accordance with the rotating speed of the rotating shaft 20, the through-hole 18 is opened and closed.

FIG. 3 shows the cover member 9 which is in a condition that the partition plate 10 is detached. The cover member 9 has four passages 25 which outwardly extends and perpendicularly crosses the circular projections 14 of the cover member 9. The four passages 25 are arranged at 90° intervals on the cover member 9 to cut away a part of the circular projections 14 so that the bottom surface of the passage 25 is the same in hight level as the bottom surface of the cover member 9. In FIG. 2, reference numeral 26 designates a shelf portion to which a partition plate 10 is disposed and whose projection is caulked to fixedly connect the partition plate 10 with the cover member 9.

The manner of operation of the thus arranged fluid coupling F will be discussed hereinafter.

Just after starting of the engine, the valve plate 21 closes a through-hole 18 due to the operation of the bimetal 19 and practically stops the circulation of the operating fluid when the ambient temperature near the bimetal 19 is low. Accordingly, the flow amount of the operating fluid supplied to the labyrinth grooves is largely decreased. This tends to lower the transmitted torque from the disc member 6 to the housing 3, and therefore the cooling fan is rotated in a low rotating speed.

Then, in accordance with the raising of the ambient temperature near the bimetal 9, the valve plate 21 gradually opens the through-hole 18 so that the operating fluid in the storage chamber 11 is fed into the operating chamber 12.

Almost all the amount of the operating fluid, which is sucked into the operation chamber 12 through the through-hole 18, is guided to the pump (mechanism) portion 16 formed at the outer peripheral portion of the disc member 6 through the passage 25 without passing through the labyrinth grooves. Although a part of the operating fluid is returned to the storage chamber 11 through the return passage 15 due to the pump portion 16, almost amount of the operating fluid fills the labyrinth grooves from the outer peripheral portion of these grooves. Accordingly, the housing 3 connected with the cooling fan increases its rotating speed in accordance with the amount of the operating fluid filled in the labyrinth grooves.

With this improved arrangement, the operating fluid supplied from the storage chamber 11 to the operation chamber 12 is supplied to the labyrinth grooves from its outer peripheral portion without being supplied from its inner peripheral portion, and the amount of the operating fluid filled in the labyrinth grooves is increased in accordance with the amount of the operating fluid supplied through the through-hole 18. Therefore, the cooling fan is smoothly rotated in the transition process from a low ambient temperature condition to a high ambient temperature condition without occurring an unnecessary drive torque in the labyrinth grooves.

Figure 4:
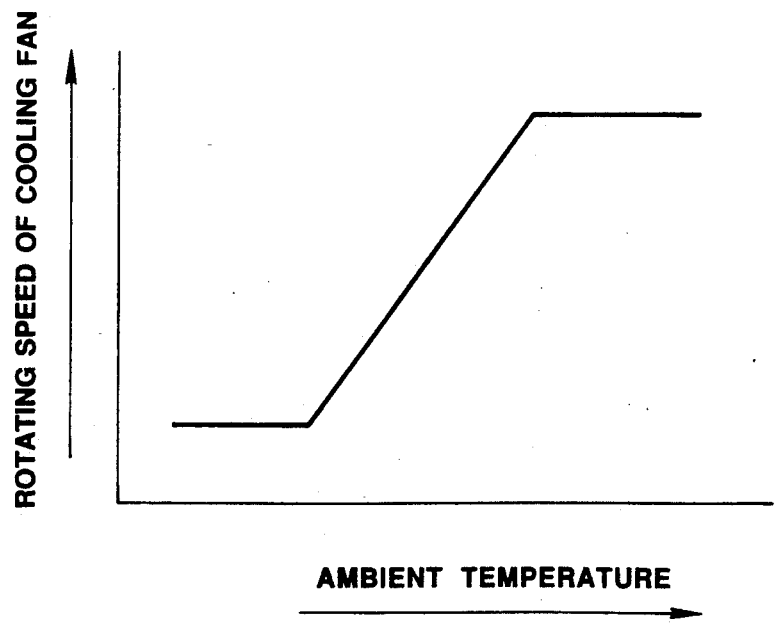
FIG. 4 is a graph which shows an output characteristics of the fluid coupling according to the present invention.
Figure 5:
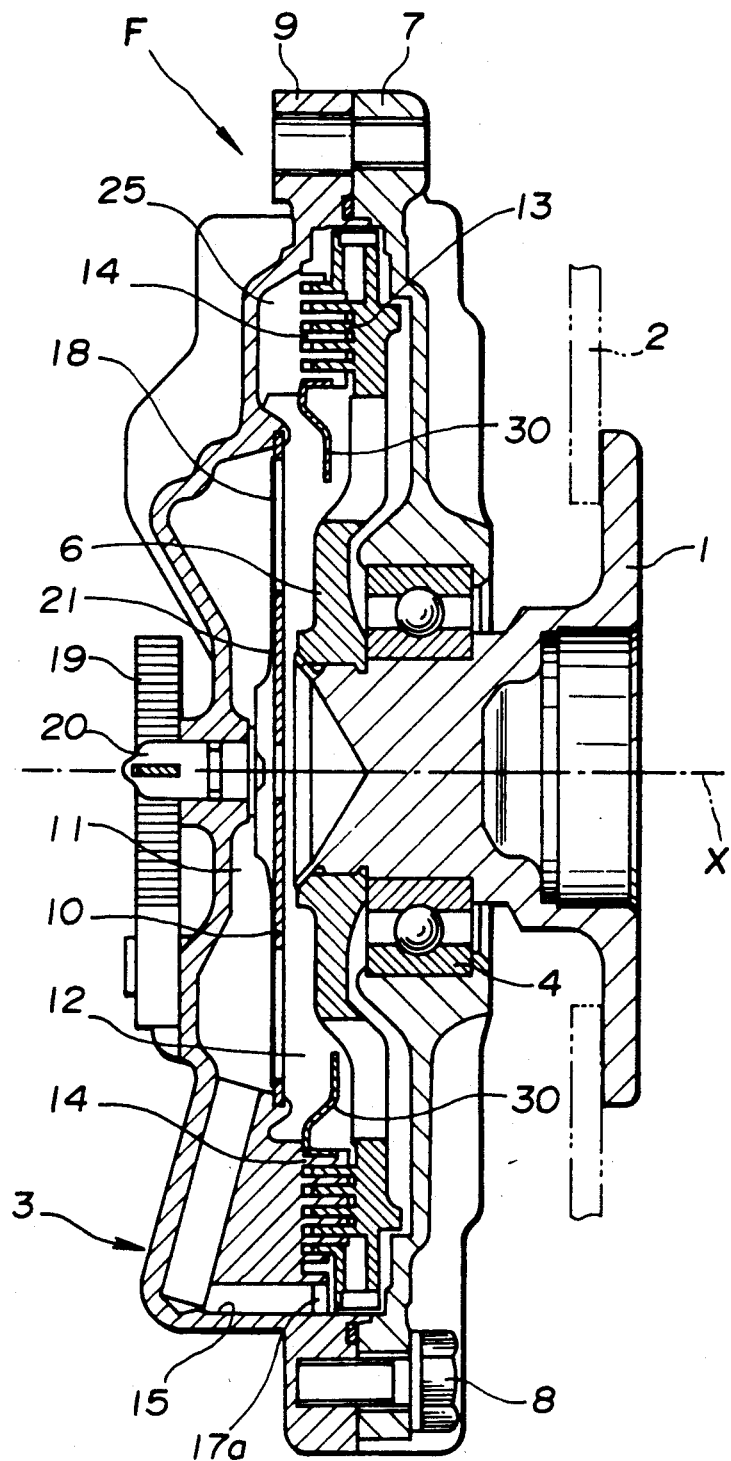
FIG. 5 is a side cross-sectional view of a second embodiment of a fluid coupling according to the present invention.

Accordingly, the output power characteristics of the cooling fan (fluid coupling) in accordance with the raising of the ambient temperature is changed without occurring a hunting phenomenon, in cooperation with the shapes of the through-hole 18 and the valve sheet 21, as shown in FIG. 4, Referring to FIG. 5, there is shown a second embodiment of the fluid coupling F in accordance with the present invention.

The second embodiment of the fluid coupling F is similar to the first embodiment except that a ring member 30 is secured to the inner side of (most inner one) of the circular projections 14. The ring member 30 is formed so that its inner diameter portion approaches to the disc member 6. That is, the ring member 30 is bent at its middle circular portion so as to be separated from the through-hole 18.

With this arrangement, the operating fluid supplied to the operating chamber 12 through the through-hole 18 is guided to the pump portion 16 through the passage 25 since the ring member 30 functions as a fence against the operating fluid. Accordingly, the labyrinth grooves is more effectively filled with the operating fluid from the outer peripheral portion of the grooves.

Since the passage 25 is formed at the cover member 9 to extend outwardly in the above discussed embodiments, the operating fluid tends to be guided into the passage 25 along an inner wall surface of the operating chamber 12 of the cover member 9 when the operating fluid is fed from the through-hole 18 to the operation chamber 12. This arrangement is preferred to forming a passage to the disc member 6.

What is claimed is:

1. A fluid coupling for an engine cooling fan, comprising:

a drive member;

a driven member rotatably driven about a center axis and sealingly comminicated with said drive member, said driven member defining a storage chamber and an operation chamber thereinside and having a plurality of circular projections to the operation chamber defining surface thereof;

an inlet port disposed at a first radial distance from the center axis for communicating fluid from the storage chamber to the operation chamber;

a return port disposed at a second radial distance from the center axis for communicating fluid from the operating chamber to the storage chamber wherein the second radial distance is greater than the first radial distance.

a disc member disposed in the operation chamber and fixedly connected to said drive member, said disc member having a plurality of circular projections which are arranged to be engaged with the plurality of circular projections of said driven member at a predetermined distance to form at least an outer and an inner radially disposed circular labyrinth grooves therebetween;

passage means formed on said driven member between the inlet port and the return port, said passage means being sufficiently large to pass the fluid from the inlet port to an outer peripheral portion of the driven member without passing fluid through the labyrinth grooves; and means formed on the outer peripheral portion of the driven member for feeding the fluid successively from the outer labyrinth groove to the inner labyrinth groove.

2. A fluid coupling according to claim 1 wherein said passage means extends substantially perpendicular to the circular projections on said driven member and is formed at least in part by grooves in the circular projections.

3. A fluid coupling according to claim 2 wherein said passage means includes four passages which are arranged at 90° intervals on said driven member so that a bottom surface of each of the passages is the same as the bottom surface of said driven member.

4. A fluid coupling according to claim 1 wherein the inlet port is formed in a valve plate which separates said storage chamber from said operation chamber.

5. A fluid coupling according to claim 4 comprising a temperature responsive valve means associated with said valve plate for opening and closing the inlet port.

6. A fluid coupling according to claim 5 wherein said valve means is operated to open the inlet port in response to a rise in the ambient temperature near the valve means.

7. A fluid coupling according to claim 1 wherein the circular projections of said driven member are coaxially formed relative to the center axis of said driven member, and the circular projections of said disk member are coaxially formed relative to the center axis of said disk member.

* * * * *